Feb. 9, 1926. 1,572,204
J. H. HAMMOND, JR
MEANS FOR LIMITING THE EFFECT OF STATIC OR OTHER DISTURBANCES
IN WIRELESS TELEGRAPHY
Original Filed August 20, 1917
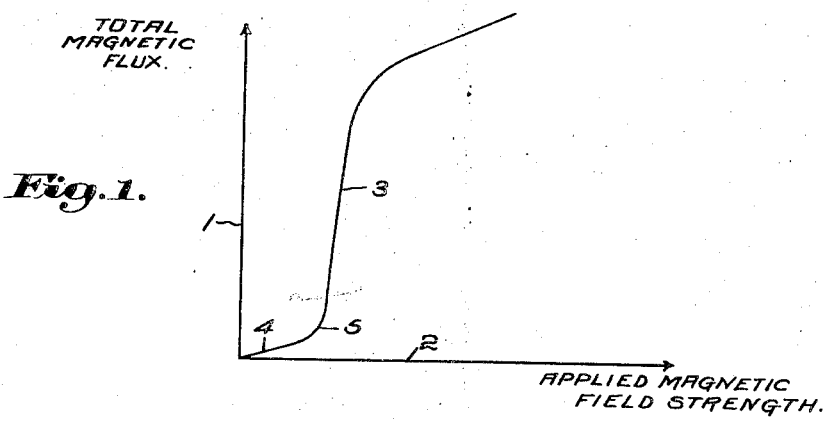
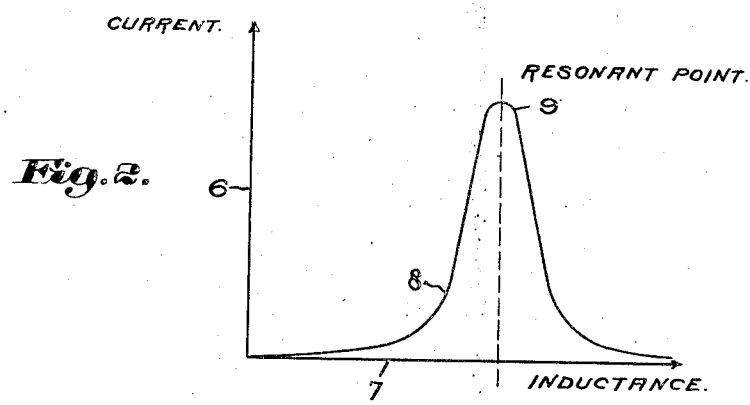
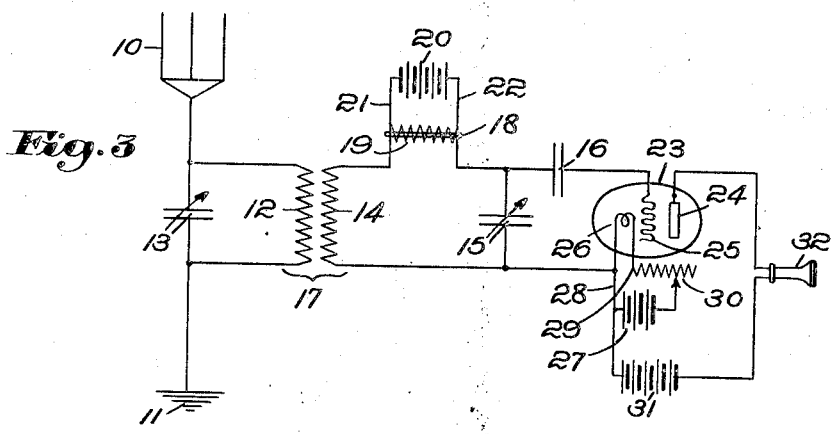
Inventor:
John Hays Hammond, Jr.
by Emery, Booth, Janney & Varney
Attys.

Patented Feb. 9, 1926.

1,572,204

UNITED STATES PATENT OFFICE.

JOHN HAYS HAMMOND, JR., OF GLOUCESTER, MASSACHUSETTS.

MEANS FOR LIMITING THE EFFECT OF STATIC OR OTHER DISTURBANCES IN WIRELESS TELEGRAPHY.

Application filed August 20, 1917, Serial No. 187,060. Renewed July 24, 1923.

*To all whom it may concern:*

Be it known that I, JOHN HAYS HAMMOND, Jr., a citizen of the United States, and a resident of Gloucester, in the county of Essex and Commonwealth of Massachusetts, have invented an Improvement in Means for Limiting the Effect of Static or Other Disturbances in Wireless Telegraphy, of which the following description, in connection with the accompanying drawings, is a specification, like characters on the drawings representing like parts.

This invention relates to means for and methods of limiting the effect of interference, static or other disturbances encountered in wireless telegraphy.

In order that the principle of the invention may readily be understood, I shall set forth one form of means for practicing my invention and the mode best known to me for carrying the same into effect.

In the accompanying drawing,—

Fig. 1 diagrammatically represents a typical magnetization curve for iron;

Fig. 2 diagrammatically represents the phenomenon of electrical resonance; and

Fig. 3 is a diagram representing in detail a receiving system for radiant energy embodying my invention and showing one form of means for carrying the same into effect.

In accordance with the preferred embodiment of my invention, and in accordance with the preferred mode of practicing the same, I make use of certain characteristics of iron and in Fig. 1 I have represented a typical magnetization curve for a piece of iron. In said figure the vertical line 1 indicates the total magnetic flux or magnetization, and the horizontal line 2 indicates the applied magnetic field strength. The curved line 3 indicates the magnetization curve for iron. This curve is characterized by a slow start or slightly inclined portion 4 rapidly succeeded by a quick rise indicated at 5.

In Fig. 2 the vertical line 6 indicates the current, and the horizontal line 7 the inductance. The curve 8 with its characteristic peak 9 indicating the resonant point, represents the passage of a current upon which sinusoidal electromotive force is impressed. It will be noted that owing to resonance, a small change in the inductance will cause a considerable change in the curve of the current when near the resonant point.

In accordance with the preferred embodiment of my invention I introduce iron into a resonated circuit of a radio-dynamic receiving system. I will proceed to disclose in detail such a system and explain the manner in which the iron is introduced thereinto, but I desire it clearly to be understood that my invention is not limited to that specific form of the invention herein disclosed nor to the use of iron, since any other material having the requisite characteristics may be employed. I have, however, obtained by far the best results with iron.

In Fig. 3 the antenna of the radio-dynamic receiving system is indicated at 10, the ground at 11, and the primary winding is indicated at 12. Preferably I provide a variable condenser 13 for tuning purposes. The secondary winding of the closed oscillatory circuit is represented at 14, and included in said circuit are the variable condenser 15 and the condenser 16, the former being for tuning purposes. The coils 12 and 14 thus constitute respectively the primary and secondary of the oscillation transformer herein generally indicated at 17.

The iron substance or equivalent material may be introduced into the receiving system and preferably into the closed oscillatory circuit thereof in any suitable manner. Herein I have represented the iron in the form of a bar 18 about, or in suitable relation to which, is coiled or otherwise suitably positioned the winding 19 forming a part of the closed oscillatory circuit. Preferably, but not necessarily, I provide means to bring the iron up to the desired point on the magnetization curve, and for that purpose I have herein represented a battery 20, the conductors 21, 22 of which form a part of or are suitably connected with the closed oscillatory circuit.

The closed oscillatory circuit is provided with some suitable detector or member similarly functioning, but to the form or type thereof I am in no wise limited. Herein for the purpose I have represented an audion detector consisting of a highly evacuated member 23 having sealed therein a plate 24, a grid 25 and a filament 26 preferably positioned as shown. A heating battery for the filament 26 is indicated at 27, being connected thereto by conductors 28, 29, one of which, and herein the conductor 29, is preferably provided with a variable resistance 30. In circuit with said conductor 28 and with the plate 24 is a battery 31 and a telephone 32. As herein indicated, the battery 31 is preferably stronger than the battery 27.

When an ordinary signal from a distant station is being received, the circuits 12, 13 and 14, 15, 18 will be properly resonated so as to give strong response in the detector, one form or type of which is herein indicated. The effect, however, of strong interference, static discharges, etc. and even that of a very strong regular signal will be to cause an increase in the current in the said circuit 14, 15, 18. Such increased current, passing through the windings of the iron core or like means 18, will increase the magnetic field strength applied to the said iron core 18. The effect of this, as will be evident from the characteristic curve provided in Fig. 1, will be to throw or to tend to throw the circuit 14, 15, 18 out of resonance with the primary circuit 12, 13 so that in accordance with my method and in the operation of the apparatus herein shown, exceptionally heavy impulses received by the antenna 10 will limit or will tend to limit their effects in the secondary circuit 14, 15, 18. Or in other words, such disturbances will tend to choke themselves off.

I contemplate in the practice of my invention the employment of any suitable means whereby exceptionally heavy impulses whether static or otherwise, tend to throw the open and the closed oscillatory circuits out of resonance, and desire to claim the same particularly. This broad result, however, is best accomplished in the manner and by the means herein set forth, and I desire particularly to claim that more specific disclosure of my invention herein set forth.

The iron core 18 or other material similarly functioning undergoes a change in the possible permeability by the increase in strength of the magnetic field. When such permeability is changed, it changes the inductance of the high frequency circuit, and therefore detunes it so that there being no resonance or tuning, the currents therein cannot build up in amplitude. Preferably the iron core or similarly functioning material is finely laminated so that eddy currents are not set up in the core when signals are received.

Obviously the iron core 18 or similarly functioning member may be situated at any other suitable point in the receiving system, as, for example, in the circuit 12, 13. Furthermore, within the scope and purpose of my invention, such iron core or similarly functioning member may be situated in circuits subsequent to the detector, one form of which I have herein disclosed.

It will be evident from the foregoing description that in accordance with my invention static or other disturbances encountered in wireless telegraphy, and particularly exceptionally heavy impulses, act automatically, as it were, to throw the circuits of the receiving system out of resonance. By this method of operation, and preferably by the means herein disclosed, I limit the effect of interference.

Having thus described one illustrative embodiment of my invention and the best mode known to me for practicing the same, I desire it to be understood that although specific terms are employed, they are used in a generic and descriptive sense and not for purposes of limitation, the scope of the invention being set forth in the following claims.

Claims.

1. A receiving system for electrical impulses comprising an oscillatory circuit including a coil, a magnetizable element surrounded by said coil, a circuit including said coil and a source of electrical energy for normally magnetizing said element to such a point that the oscillatory circuit has potential characteristics to produce resonance at the transmitted frequency, and a detector controlled by said circuit, but protected thereby from the effects of excessive electromagnetic shocks.

2. A receiving system for signalling comprising two successively acting cooperating circuits normally tuned respectively to the same frequency, one of said circuits being provided with means whereby upon the receipt of abnormal impulses the frequency of the tuning of said circuit will be automatically varied with respect to the tuning of the other circuit.

3. A receiving system for signalling comprising two successively acting cooperating circuits originally tuned respectively to the same frequency, one of said circuits being provided with means whereby upon the receipt of abnormal impulses the frequency of the tuning of said circuit will be automatically varied with respect to the tuning of the other circuit, and a detector controlled by the conjoint and successive action of said circuits.

4. In a receiver, two tuned circuits, one containing a coil surrounding a magnetizable element, a source of power connected to spaced points on the coil in series with a grid circuit of a vacuum tube and a tuning means connecting a filament of the tube and one side of the source of power.

5. In a receiver, a vacuum tube containing grid, plate and filament, means for de-tuning a circuit to the grid when oscillations out of the ordinary intensity occur, a battery serving to energize this means and tending to produce bias between the grid of the tube and the filament.

6. In a receiver, a tuned antenna circuit, a tuned receiving circuit comprising a coil on a magnetic circuit of small cross sectional area having an air gap, which is normally partially energized, a tuning means and a detector, the tuned circuits both having the same critical characteristic resonance point to oscillations when not energized by the oscillations.

In testimony whereof, I have signed my name to this specification.

JOHN HAYS HAMMOND, Jr.